United States Patent [19]

Endou et al.

[11] Patent Number: 5,777,783
[45] Date of Patent: Jul. 7, 1998

[54] MICROSCOPE

[75] Inventors: Itaru Endou; Yasushi Kaneko; Yoshihiro Kawano; Kazuo Kajitani, all of Tokyo, Japan

[73] Assignee: Olympus Optical Co., Ltd., Tokyo, Japan

[21] Appl. No.: 799,865

[22] Filed: Feb. 14, 1997

Related U.S. Application Data

[63] Continuation of Ser. No. 243,632, May 16, 1994, abandoned.

[30] Foreign Application Priority Data

May 17, 1993 [JP] Japan ................................ 5-114835
May 2, 1994 [JP] Japan ................................ 6-093427

[51] Int. Cl.[6] .......................... G02B 21/06; G02B 21/00; G02B 21/36
[52] U.S. Cl. ...................... 359/385; 359/363; 359/368
[58] Field of Search ...................... 359/363, 368–390, 359/618, 629, 636–639

[56] References Cited

U.S. PATENT DOCUMENTS

| 4,527,869 | 7/1985 | Nihoshi ........................ 359/363 |
| 4,594,608 | 6/1986 | Hatse et al. .................. 359/363 |
| 4,685,776 | 8/1987 | Inoue et al. .................. 359/363 |
| 4,756,611 | 7/1988 | Yonekubo et al. ............ 359/370 |
| 4,802,749 | 2/1989 | Togino et al. ................ 359/363 |
| 4,834,516 | 5/1989 | Kajitani et al. .............. 359/363 |
| 5,138,486 | 8/1992 | Meyer et al. ................. 359/363 |

FOREIGN PATENT DOCUMENTS

| 164680 | 12/1985 | European Pat. Off. ....... 359/385 |
| 60-263918 | 12/1985 | Japan . |
| 3-172816 | 7/1991 | Japan . |
| 4-30565 | 5/1992 | Japan . |

*Primary Examiner*—Thong Nguyen
*Attorney, Agent, or Firm*—Frishauf, Holtz, Goodman, Langer & Chick

[57] ABSTRACT

A microscope has an optical system in which the number of photographing optical paths can be increased. The optical system includes a light source, an illuminating optical system for radiating the illuminating light to a sample, an objective lens which is opposed to the sample, an imaging lens, which is arranged in an optical path of light passed through the objective lens, a first beam splitting block, arranged in an optical path between the objective lens and the primary image, for splitting the light passed through the imaging lens into at least three different directions, a second beam splitting block for splitting one of the light split by the first beam splitting block into a plurality of directions, an observation optical path which receives the light split by the second beam splitting block, and a plurality of photographing optical paths provided for the split light, wherein images of the same magnification are formed.

18 Claims, 11 Drawing Sheets

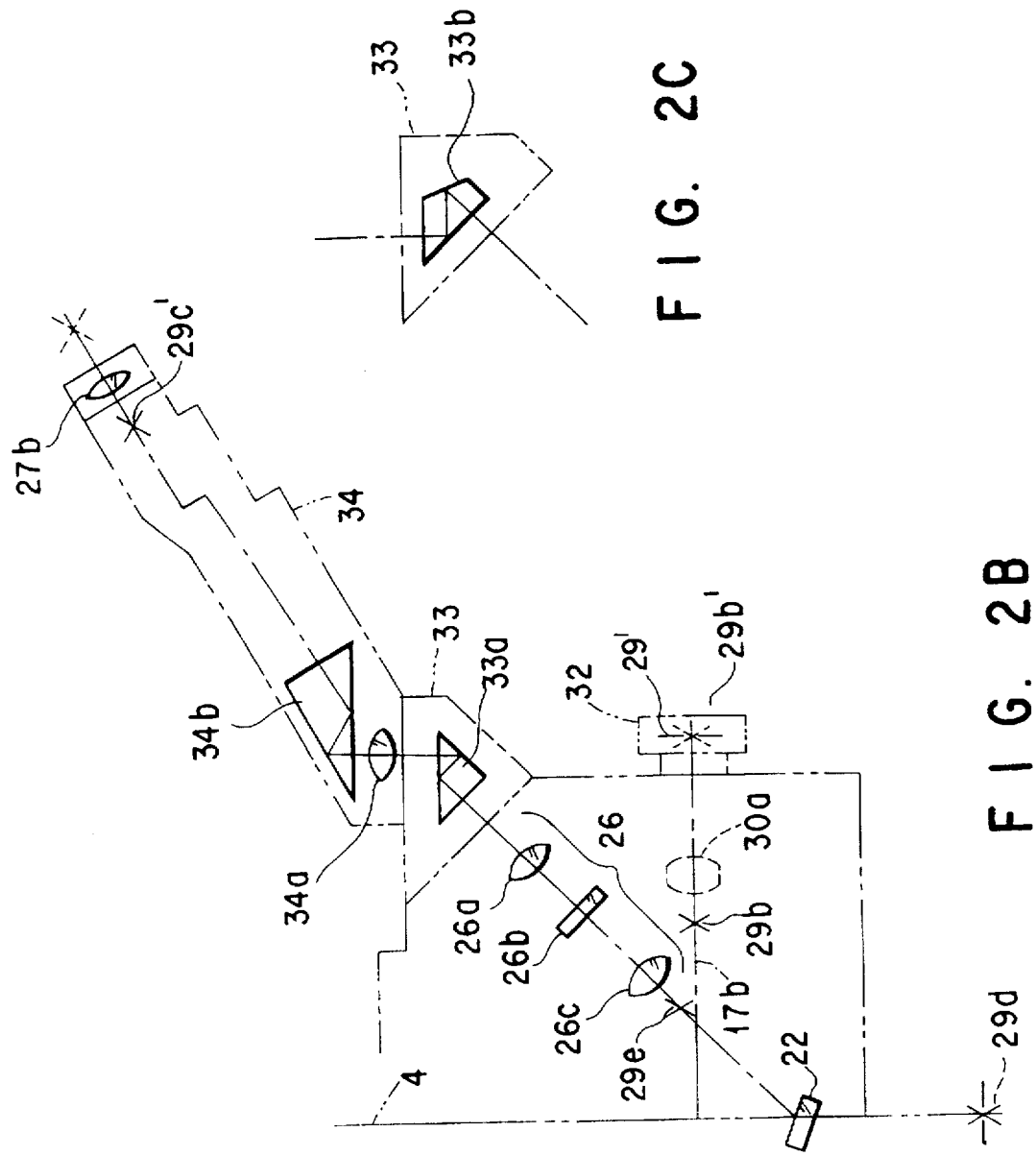

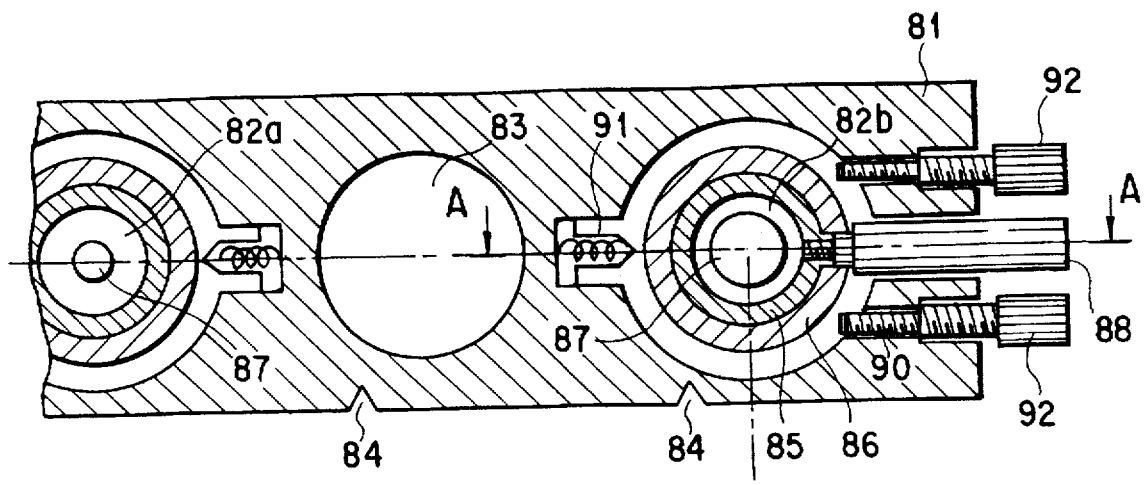
F I G. 7
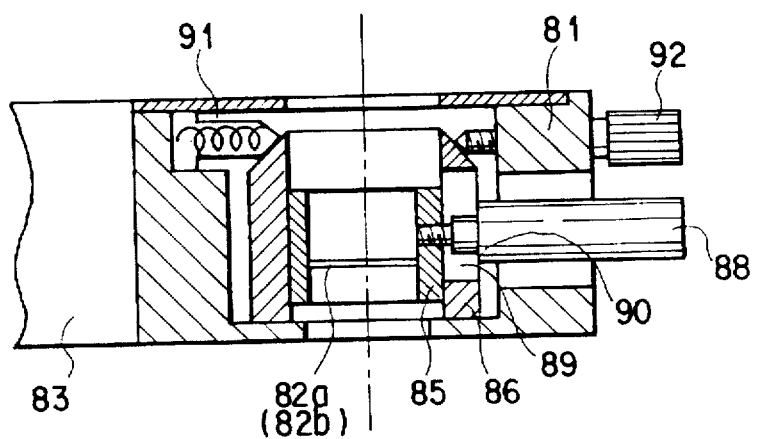
F I G. 8

MICROSCOPE

This application is a Continuation of application Ser. No. 08/243,632, filed May 16, 1994, now abandoned.

BACKGROUND OF THE INVENTION

1. Field of the Invention

The present invention relates to a microscope, and more particularly to a microscope for observing an image of a sample with an eyepiece and for observing and photographing an image of a phase factor, such as a cultured cell, wherein an optical path for photographing the image by a still camera or a TV camera can be additionally provided.

2. Description of the Related Art

A type of microscope, not only for observing a sample through an eyepiece but also for photographing an enlarged image of the sample by means of a still camera or a TV camera attached to a main microscope unit, is known. Jpn. Pat. Appln. KOKOKU Publication No. 4-30565 discloses a microscope comprising an optical element for guiding light of an enlarged image of a sample to a photographing optical light path. The microscope comprises a first optical element for guiding light from an objective lens to the photographing optical light path and a second optical element for guiding the light from the objective lens to an observing optical light path. In this microscope, one of two photographing optical light paths in two directions can be switched by switching the first optical element in three stages in a direction perpendicular to an optical axis of the element, so that a photographing optical path for a TV camera or a still camera in addition to the observing optical path can be selected.

Jpn. Pat. Appln. KOKAI Publication No. 3-172816 discloses a microscope wherein a beam splitter is inserted in an observing optical path reflected (branched) by a second optical element, so that light from an objective lens can be simultaneously guided to both an observing optical path and a photographing optical path via the beam splitter.

In recent years, in the field of biotechnology, research experiments (e.g., fluorescence obscuration or photometry in a subdued fluorescent condition) for detecting very weak light which cannot be detected by the naked eye, have been increased in accordance with development of a high-sensitivity device and fluorescence reagent. In an observation method called video microscopy, an image of light from a sample is subjected to modulation, for example, differential interference, and a modulated image is processed (enhanced) with another image detected by a photographing device, thereby improving the accuracy of detecting an amount of movement and a position of the image which is moving.

However, the optical system of a conventional microscope has only one or two photographing optical paths and the sizes of images formed in the photographing optical paths do not precisely coincide with each other. Hence, the aforementioned pioneer research methods cannot obtain satisfactory results.

For example, the fluorescence obscuration in a subdued fluorescent condition requires three TV cameras: i.e., a cooled CCD camera for increasing space resolving power, a photodiode array for increasing time resolving power and a compact CCD camera for recording the form of a sample. Therefore, at least three photographing optical paths must be provided.

In the microscope of Jpn. Pat. Appln. KOKAI Publication No. 4-30565, two photographing optical paths in two directions (forward and leftward in the drawing) are provided by changing the first optical element in three stages. However, since one of the photographing optical paths is exclusive to a 35 mm still camera, only one TV camera can be attached to the microscope.

Further, a method, for accurately measuring a change or movement of a sample according to time by accurately measuring the sizes of images photographed by a plurality of TV cameras and superimposing or comparing the images, has been proposed. However, if the sizes of the images do not coincide with each other, this method cannot be employed.

SUMMARY OF THE INVENTION

The present invention has been made in consideration of the above situations, and has as its object the provision of a microscope in which the number of photographing optical paths can be increased and magnifications of projected images in the photographing optical paths can be equal to each other, and which is applicable in the field of biotechnology and satisfies various requirements in research in this field.

According to an aspect of the present invention, there is provided a microscope comprising:

a light source for emitting illuminating light;

a transmitted or reflected illuminating optical system for radiating the illuminating light emitted by the light source to a sample;

an objective lens which is opposed to the sample and receives object light from the sample;

an imaging lens, which is arranged in an optical path of light passed through the objective lens and focuses the light at a predetermined position, for forming a primary image of the sample;

a beam splitting mechanism, arranged in an optical path between the objective lens and the primary image, for splitting the light passed through the imaging lens into at least three different directions;

an observation optical path which receives light in one of the plurality of directions split by the beam splitting mechanism; and a plurality of photographing optical paths provided for the light in at least two directions split by the beam splitting mechanism, except the light received by the observation optical path, wherein images of the same magnification are formed.

With the above microscope, the light passed through the objective lens is split by the beam splitting mechanism into at least three different directions. The light in one of the plurality of directions split by the beam splitting mechanism is input to the observation optical path. The lights in the other directions are input to the plurality of photographing paths having the same magnification. Thus, at least three photographing optical paths can be formed without degrading the quality of the image.

According to another aspect of the present invention, there is provided an inverted microscope comprising:

a light source for emitting illuminating light;

a transmitting or reflected illuminating optical system for radiating the illuminating light emitted by the light source to a sample;

an objective lens, which is arranged under the sample and receives object light from the sample, for outputting an enlarged light beam corresponding to an enlarged image of the sample;

an imaging lens, which is arranged in an optical path of light passed through the objective lens and focuses the enlarged light beam, for forming an image of the sample;

a beam splitting unit, arranged in an optical path of light passed through the imaging lens, for splitting the light passed through the imaging lens into at least three different directions including a transmitting direction in which the light is passed through the beam splitting unit;

a re-splitting member, arranged in an optical path in the transmitting direction, for re-splitting the light in the transmitting direction into a plurality of directions;

an observation optical path which receives light in one of the plurality of directions re-split by the re-splitting member;

a plurality of photographing optical paths provided for the light in the directions slitted by the beam splitting unit and the light in the directions re-split by the re-splitting member, except the light in the transmitting direction and the light received by the observation optical path, all the plurality of photographing optical paths having the same magnification; and an eyepiece, arranged in the observation optical path, for observing the image of the sample formed in the observation optical path.

With this inverted microscope, the beam splitting unit receives the light passed downward through the imaging lens and splits the light into the photographing optical paths in three different directions. Thus, at least three image photographing devices, such as a still camera and a TV camera, can be mounted on the microscope.

In addition, since images of the same magnification are formed in the photographing optical paths by the imaging lens, the images of the sample photographed by the at least three image photographing devices are of the same size. Therefore, the images can be easily compared with each other or processed.

Further, the re-splitting member has a function of guiding the light transmitted downward through the beam splitting unit into an additional photographing optical path, as well as a function of guiding it to the observation optical path. Therefore, one more photographing device, such as a TV camera, can be mounted to the microscope. In this case, since the magnification of an image formed in the additional photographing optical path is set equal to those in the other photographing optical paths, an image of the same conditions as those photographed by the photographing devices in the other optical paths can be obtained.

The inverted microscope of the present invention may further comprise:

a main microscope housing for housing the beam splitting unit and the re-splitting member;

a first attachment mechanism for detachably attaching the beam splitting unit to the main microscope housing; and a second attachment mechanism for detachably attaching the re-splitting member to the main microscope housing.

In this microscope, the beam splitting unit is detachably attached to the main microscope housing incorporating the optical members such as the objective lens, the imaging lens, the re-splitting member and the like. Hence, the user can easily exchange the beam splitting unit with another one having specifications (characteristics) in accordance with the object of observation.

The inverted microscope of the present invention may further comprise:

a parallel optical system, formed in a predetermined portion of the observation optical path, for making a light beam passed through the portion parallel with an optical axis of the observation optical path; and an intermediate lens barrel detachably inserted in the parallel optical system.

Therefore, it is possible to insert an intermediate lens barrel, such as a discussion lens barrel or a variable magnification lens barrel, in the parallel optical system formed in the observation optical path.

According to still another aspect of the present invention, there is provided an inverted microscope comprising:

a light source for emitting illuminating light;

an illuminating optical system for radiating the illuminating light emitted by the light source to a sample;

an objective lens, which is arranged under the sample and receives object light from the sample, for outputting an enlarged light beam corresponding to an enlarged image of the sample;

an imaging lens, which is arranged in an optical path of light passed through the objective lens and focuses the enlarged light beam, for forming an image of the sample;

a beam splitting unit, arranged in an optical path of light passed through the imaging lens, for splitting the light passed through the imaging lens into at least three different directions including a transmitting direction in which the light is passed through the beam splitting unit;

a re-splitting member, arranged in an optical path in the transmitting direction, for re-splitting the light in the transmitting direction into a plurality of directions;

an observation optical path which receives light in one of the plurality of directions re-split by the re-splitting member;

a plurality of photographing optical paths provided for the light in the directions split by the beam splitting unit and the light in the directions re-split by the re-splitting member, except the light in the transmitting direction and the light received by the observation optical path, all the plurality of photographing optical paths having the same magnification;

a relay lens system, arranged in the observation optical path, for relaying the image of the sample formed in the observation optical path; and an eyepiece, arranged in the observation optical path, for observing the image of the sample relayed by the relay lens system.

With the above erect microscope, like the inverted microscope mentioned above, the beam splitting unit receives the light passed upward through the imaging lens and splits the light into the photographing optical paths in three different directions. Thus, at least three image photographing devices, such as a still camera and a TV camera, can be mounted on the microscope. Further, since the images of the sample photographed by the at least three image photographing devices are of the same size, the images can be easily compared with each other or processed.

According to a further aspect of the present invention, there is provided an erect microscope comprising:

a light source for emitting illuminating light;

an illuminating optical system for radiating the illuminating light emitted by the light source to a sample;

an objective lens which is arranged above the sample and receives object light from the sample;

an imaging lens, which is arranged in an optical path of light passed through the objective lens and receives the light passed through the objective lens, for forming a primary image of the sample at a predetermined position;

beam splitting means, arranged in an optical path of light passed through the imaging lens, for splitting the light passed through the imaging lens into at least three different directions;

an observation optical path which receives light in one of the plurality of directions split by the beam splitting means;

a plurality of photographing optical paths provided for the light in at least two directions split by the beam splitting means, except the light received by the observation optical path, wherein images of the same magnification are formed; and a relay lens system capable of pupil modulation, arranged in one of the observation optical path and the photographing paths.

With this erect microscope also, the number of photographing optical paths can be increased, and images of the same size can be photographed by image photographing devices mounted to the photographing optical paths, resulting in easy comparison between images and image processing. Moreover, since the relay lens capable of pupil modulation is provided, fluorescence observation and phase contrast observation can be simultaneously performed. In addition, since phase contrast observation is performed with a phase plate provided outside the objective lens, the phase contrast can be easily observed without using an objective lens for use only in phase contrast observation.

BRIEF DESCRIPTION OF THE DRAWINGS

FIG. 2B is a diagram showing an optical system in which another observing lens barrel is attached to the microscope according to the first embodiment;

FIG. 2C is a diagram showing a modification of an optical path deflecting device;

FIG. 7 is a diagram showing a mechanical structure of a pupil modulator provided in the first embodiment;

FIG. 8 is a diagram showing a cross-sectional view taken along the line A—A in FIG. 7;

DETAILED DESCRIPTION OF THE PREFERRED EMBODIMENTS

Embodiments of the present invention will now be described with reference to the accompanying drawings.

(First Embodiment)

Figure 1:
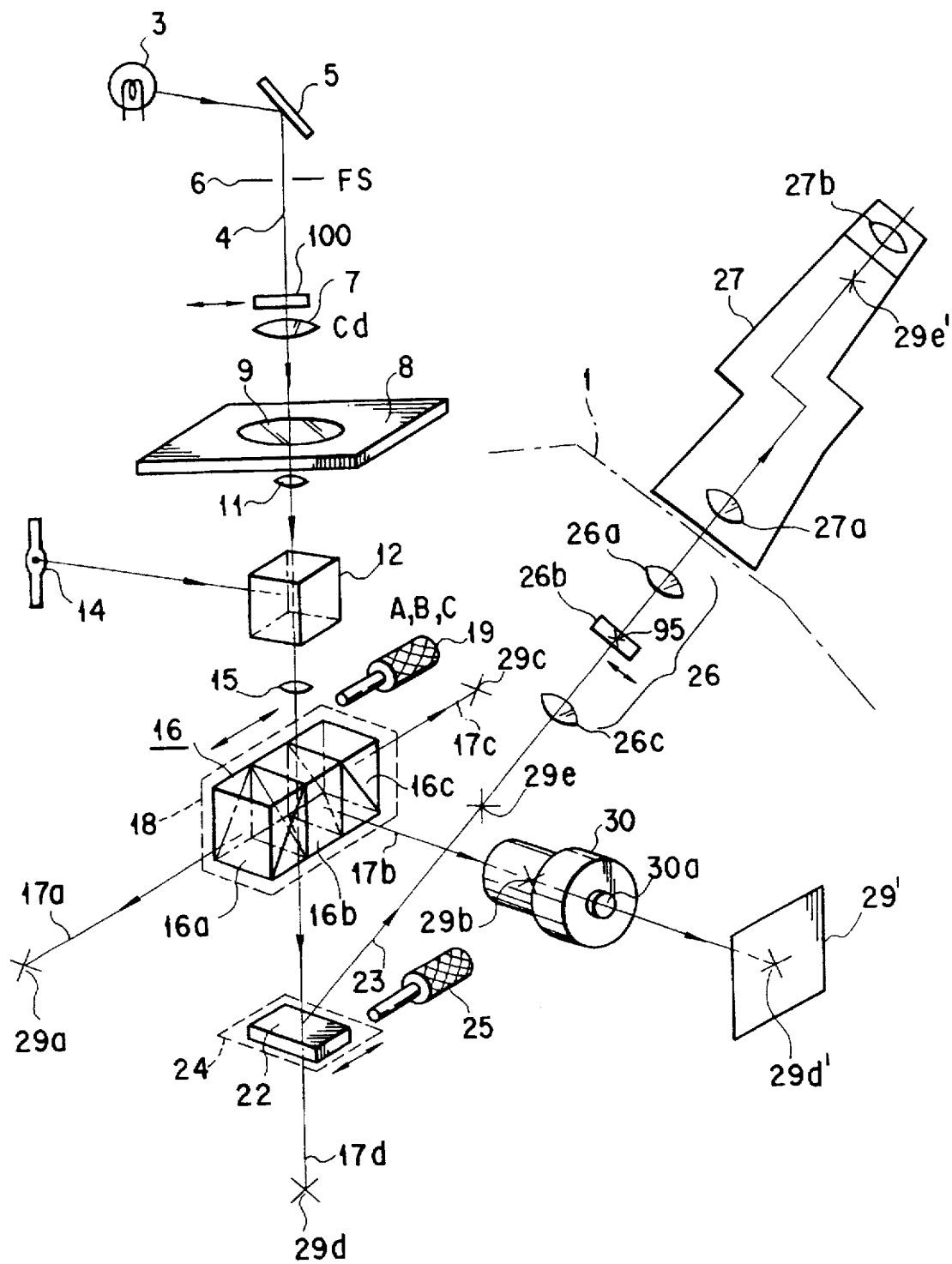
FIG. 1 is a schematic diagram showing an optical system of an inverted microscope according to a first embodiment of the present invention.
Figure 2A:
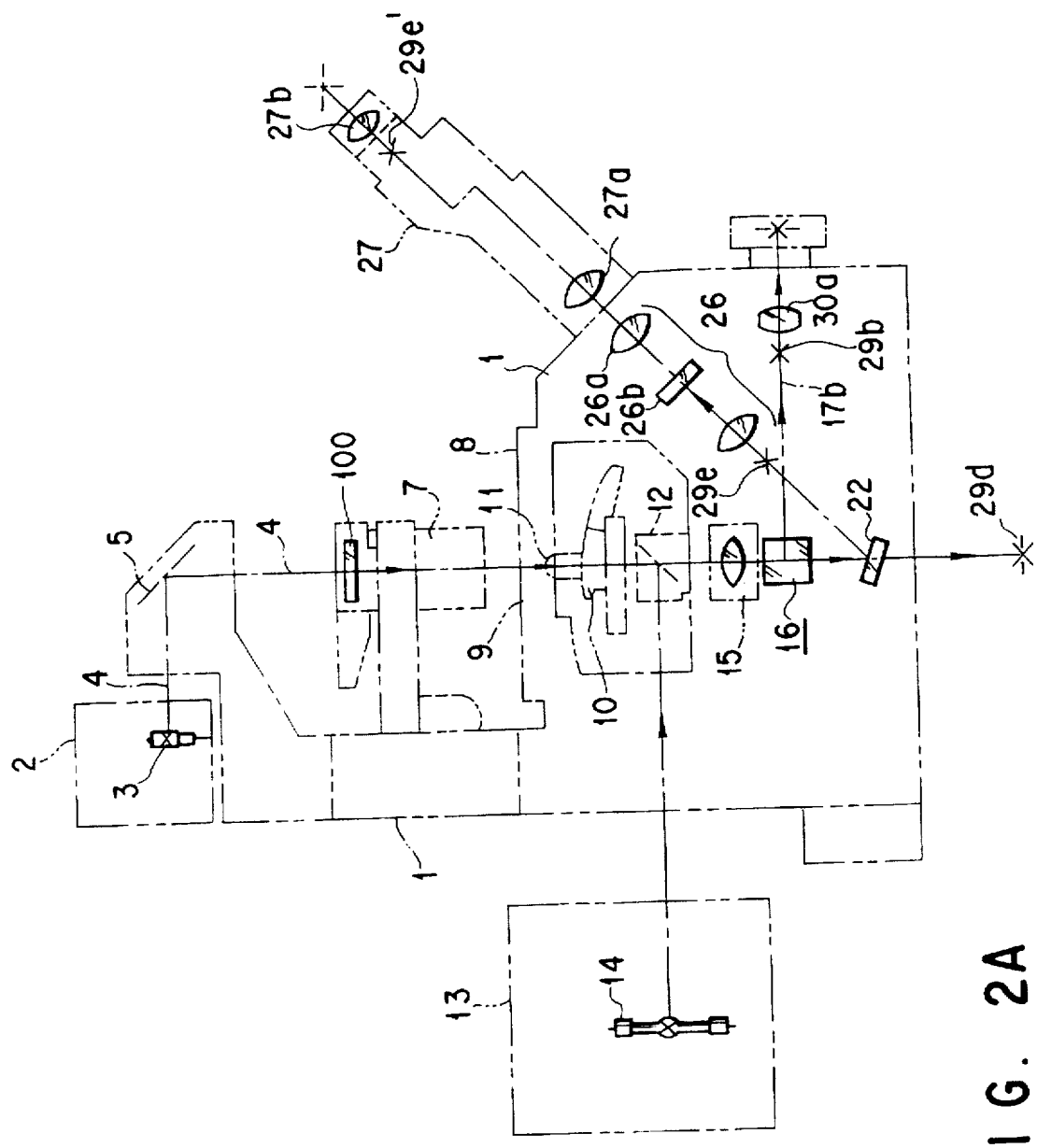
FIG. 2A is a diagram showing a side view of an optical system according to the first embodiment.
Figure 3:
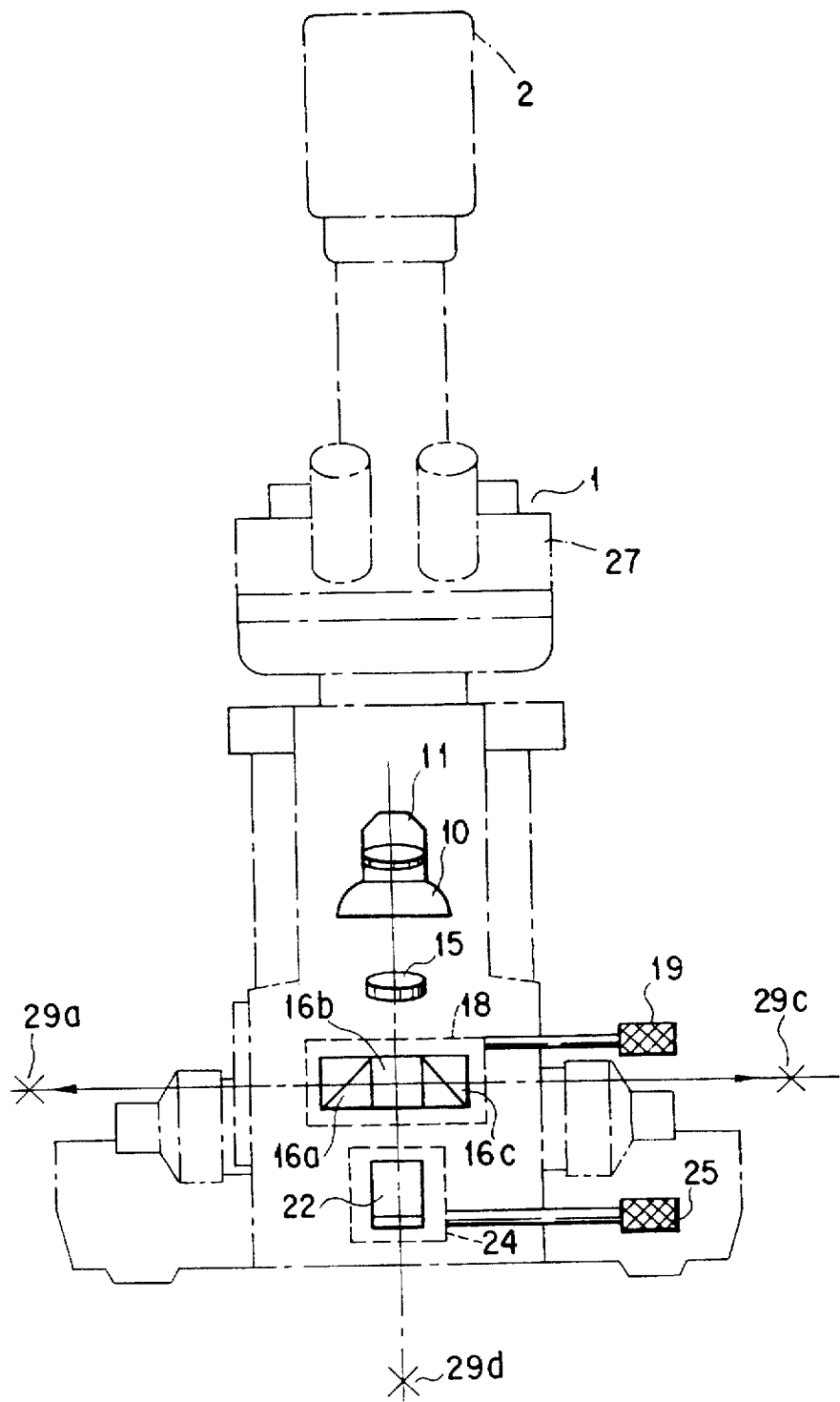
FIG. 3 is a diagram showing a front view of the internal structure of the optical system according to the first embodiment.

FIGS. 1 to 3 show a first embodiment in which the present invention is applied to an inverted microscope. FIG. 1 shows a perspective view showing the positional relationship among optical systems of the inverted microscope, and FIG. 2A and FIG. 3 show side and front views of the internal structure of the microscope.

In the inverted microscope, a light housing 2 is mounted on top of a main microscope housing 1. A light source 3 is housed in the light housing 2. Light 4 out-put from the light source 3 is deflected downward by a reflection mirror 5. The deflected light 4 is incident on a condenser lens 7 through a field stop 6. The condenser lens 7 focuses the light 4 on a sample 9 disposed on a stage 8. The light passed through the sample 9 is incident on an objective lens 11 supported by a revolver 10 arranged below the stage 8. The light passed through the objective lens 11 is incident on a fluorescent cube 12 incorporating a dichroic mirror inclined at an angle of 45° with respect to an optical axis. The fluorescent cube 12 receives light from a light source 14 of a reflected illumination system 13.

An imaging lens 15, for forming an image of light output from the objective lens 11 on a focal position, is arranged below the fluorescent cube 12. In the drawings, reference numerals 29a to 29d denote focal positions at which primary images of the sample 9 are formed by means of the imaging lens 15. The light passed through the imaging lens 15 is incident on a first optical element 16.

More specifically, the semitransparent prism beam 16a (16b or 16c) splits an incident light beam into a transmitted component and a reflected component. The reflected component is directed to the first photographing optical path 17a (the second or third photographing optical path 17b or 17c), and the transmitted component is directed downward.

More specifically, the semitransparent prism 16a (16b or 16c) splits an incident light beam into a transmitted component and a reflected component. The reflected component is directed to the first image-pickup optical path 17a (the second photographing optical path 17b or image-pickup optical path 17c), and the transmitted component is directed downward.

The three semitransparent prisms 16a to 16c are movably supported by a support table 18 indicated by a broken line in the drawings. The semitransparent prisms 16a to 16c supported by the support table 18 are movable in the horizontal direction in three stages A, B and C, by means of a position control knob 19 projecting through an outer wall of the main microscope housing 1. When the position control knob 19 is stopped at the stage A, the semitransparent prism 16a is positioned in the optical path of the light 4, so that the light 4 is guided through the photographing optical path 17a and imaged at the position 29a. When the position control knob 19 is stopped at the stage B, the semitransparent prism 16b is positioned in the optical path, so that the light 4 is guided through the photographing optical path 17b and imaged at the position 29b. When the position control knob 19 is stopped at the stage C, the semitransparent prism 16c is positioned in the optical path, so that the light 4 is guided through the image-pickup optical path 17c and imaged at the position 29c. In this manner, any one of the semitransparent prisms 16a to 16c can be selectively moved to the position on the optical axis of the incident light. As a result, the observer can guide the light passed through the imaging lens 15 to any one of the first to fourth optical paths 17a to 17d.

The optical characteristics of the semitransparent prisms 16a to 16c constituting the first optical element and a semitransparent mirror of a second optical element 22 can be changed. For example, the reflectance can be varied in a range between 0% and 100% by selecting the thickness of a ZnS-Ag thin film formed by deposition.

Further, since various specifications of the first and second optical elements 16 and 22 are required depending on the object of an experiment performed by a researcher, the reflectance/transmittance of the semitransparent prisms 16a to 16c can be set to 80/20%, 100/0% and 0/100%. In addition, if two or more wave-lengths of fluorescence are simultaneously measured, dichroic mirrors which reflect light of shorter wave-length and transmit light of longer wavelength light can be used in place of the semitransparent prisms 16a to 16c. A TV camera and a photometry element can be respectively provided in the optical paths 17a and 17b or 17c and 17d. Hence, simultaneous comparison and simultaneous photometry can be attained by use of photographing optical path 17d and one of photographing optical paths 17a, 17b and 17c. Furthermore, a mirror having a reflectance of 100%, i.e., a total reflection mirror, can be used in place of the semitransparent mirror of the second optical element 22.

The magnifications of primary images of the sample 9, which are formed in the optical paths 17a to 17c, are adjusted to be completely the same. Since the objective lens 11 itself is an infinity correction objective, it is unnecessary to provide a finite correction objective with an imaging lens for infinity correction and the image of the sample 9 can be focused by moving the revolver 10. Further, since the imaging lens 15 corresponds to the infinity correction objective and no lens is interposed between the imaging lens 15 and the focal position 29a, 29c and 29d of each optical path, the magnifications in the optical paths are the same. In this embodiment, the focal distance $f_B$ of the imaging lens 15 is 180 mm and the magnification is set to [1x].

Light transmitted downward through one of the semitransparent prisms 16a to 16c of the first optical element 16 is incident on the second optical element 22. The second optical element 22, formed of, for example, a semitransparent mirror, reflects incident light toward an observing optical path 23 and transmits it downward to another image-pickup optical path 17d.

The second optical element 22, like the first optical element 16, is movably supported by a support table 24 and can be drawn out of the main microscope housing 1 by operating an inserting and removing lever 25. When the second optical element 22 is drawn out of the optical path by means of the inserting and removing lever 25, the light is not guided to the observing optical path 23 but incident only on the photographing optical path 17d. When the second optical element 22 is inserted in the optical path, the light is incident on both the observing optical path 23 and the photographing optical path 17d.

The second optical element 22, like the first optical element 16, can be replaced by a semitransparent mirror having another optical characteristic by the observer, if necessary, by operating the inserting and removing lever.

As a modification, the supporting table 24 supporting the optical element 22 and the inserting and removing lever 25 can be integrally formed as one piece, which are attached to the bottom of the main microscope housing 1 so as to be removed aside from the optical path. This mechanism also allows the light to be either reflected toward the observing optical path 23 or transmitted through only to another optical path 17d formed under the second optical element 22.

The light transmitted through the second optical element 22 and introduced into the optical path 17d is imaged at the position 29d at a distance from the second optical element, the same as the distance between an image and the first optical element in the optical paths 17a to 17c. It is clear that the magnification of a primary image of the sample 9 formed in the optical path 17d is completely the same as those in the optical paths 17a, 17c since no lens is interposed between the imaging lens 15 and each of the positions 29a, 29c, 29d. A TV camera mount (not shown) adapted for a flange back of a desired TV camera can be arranged on the exterior of the main microscope housing 1 in the optical path 17d, so that a photographing surface of the TV camera can be arranged at the position 29d in the optical path 17d. In other words, the imaging lens has a focal distance which allows the mount to be attached to the exterior of the main microscope housing 1. The same applies to the positions 29a and 29c in the optical paths 17a and 17c.

The main microscope housing 1 has such a size that the position 29d in the optical path 17d, in which the light transmitted through the first optical element 16 is introduced, allows the mount to be attached to the exterior of the main microscope housing 1, even if the first optical element 16 is removed, i.e., the light passed through the imaging lens 15 is directly introduced to the optical path 17d.

The light reflected by the second optical element 22 and introduced in the observing optical path 23 is also imaged at a focal position 29e.

It is possible to insert a mask glass for defining a photographing region and a scale glass for comparing the sizes of images in the position 29e.

In the photographing optical path 17b in which the light reflected in the horizontal direction by the first optical element 16 is introduced, a primary image is formed in a photographing lens 30. The primary image is enlarged by the lens group 30a which includes the photographing lens 30, and secondarily imaged at point 29d', so that the image of the sample 9 is recorded on the film surface 29'.

Since an optical path is formed under the second optical element 22, i.e., on the rear side of the microscope, and the magnification in this optical path is the same as that in the other optical paths, one more TV camera can be attached to the microscope.

Since the first and second optical elements 16 and 22 can easily be attached to or detached from the main microscope housing 1 and easily be exchanged with another element, an optical path is provided which is suitable for various research experiments and satisfies specifications requested by researchers. As a result, one microscope suffices for various research experiments and is applicable to development of the research. Further, the efficiency of a research can be improved.

As described above, according to the present invention, since the microscope has three photographing optical paths reflected by the first optical element 16, even if one of them is used as an optical path only for a 35 mm still camera, the other two paths can be used for, e.g., a high sensitivity TV camera and a high resolution TV camera. In addition, since the magnifications in the optical paths are the same, the size of a sample can be detected easily and the images can easily be superposed on each other or compared with each other by using a plurality of images obtained by the cameras. Further, operability and working efficiency of the microscope and precision of experiments, which are required to perform researches using the fluorescence obscuration or photometry in subdued fluorescent condition, can be enhanced. More specifically, a portion of a cell in a field of view can be adjusted to the center of a cooled CCD with a photodiode array further adjusted thereto, and at the same time, the form of the sample can be recorded by the compact CCD. Thus, photographing can be performed using two optical paths simultaneously, or observation and photographing can be performed in combination.

Figure 4:
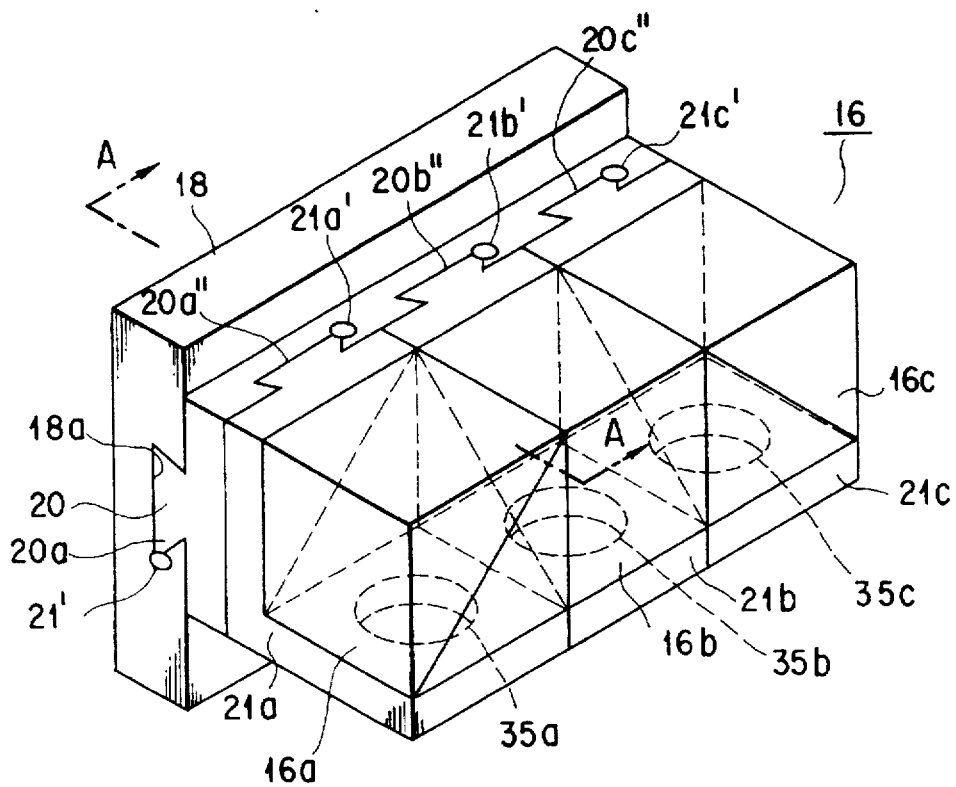
FIG. 4 is a diagram showing a perspective view of main part of a mechanism for inserting or releasing a first optical element in or from a main microscope housing according to the first embodiment.

FIG. 4 is a perspective view showing the positional relationship between the support table 18 and the semitransparent prisms 16a to 16c. The support 18 has a dovetail groove 18a extending horizontally. A dovetail 20a of a movable member 20, which is moved by means of the position control knob 19, is slidably engaged with the dovetail groove 18a. When the position control knob 19 is operated, the movable member 20 is slid horizontally by means of the dovetail 20a and the dovetail groove 18a.

As shown in FIG. 4, a stopper screw 21' is screwed in the support table 18 near an end portion of the dovetail groove 18a. When the semitransparent prism 16c on the opposite side is inserted in the optical path, positioning is performed by controlling the amount of projection of the head of the stopper screw 21'.

Another stopper screw is provided on the opposite side of the dovetail groove 18a in the same manner. When the semitransparent prism 16a on the front side is inserted in the optical path, positioning is performed by controlling the amount of projection of the stopper screw. The central semitransparent prism 16b can be positioned in the optical path by means of a conventional click mechanism (not shown).

The movable member 20 has dovetail grooves 20a", 20b" and 20c" extending vertically. Support frames 21a, 21b and 21c for supporting the semitransparent prisms 16a, 16b and 16c are inserted in the dovetail grooves 20a", 20b" and 20c". The dovetail grooves 20a", 20b" and 20c" do not necessarily extend vertically, but can extend horizontally, i.e., in the direction in which the movable member 20 is slid. In this case, the support frames 21a to 21c of the semitransparent prisms 16a to 16c are fixed to the movable member 20 by pressing the top ends of screws 21a', 21b' and 21c' against the dovetail grooves 20a", 20b" and 20c", respectively.

As a modification, a positioning pin or fixing means consisting of a groove and a vis may be additionally used to fix the support frame 21 to the movable member 20.

The movable member 20 including the supporting frames 21a to 21c can be entirely drawn out of the main microscope housing 10 by unscrewing and removing the stopper screw 21' from the support table 18 and operating the position control knob 19.

Figure 5:
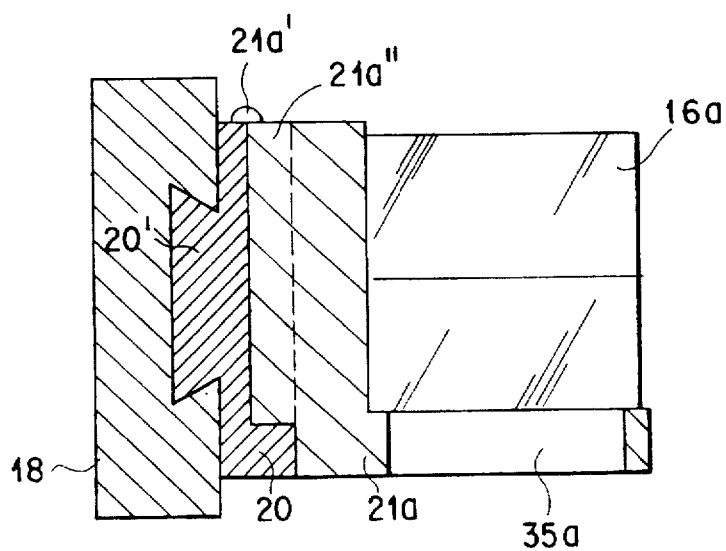
FIG. 5 is a diagram showing a cross-sectional view taken along the line A—A in FIG. 4.

FIG. 5 is a cross-sectional view taken along the dot-dash line A—A in FIG. 4 and viewed in the direction indicated by the arrows. The observer can easily exchange a semitransparent prism 16a, 16b or 16c with another prism having another optical characteristic by drawing the prism out of the support frame 21a, 21b or 21c. The semitransparent prisms 16a to 16c can be removed from the movable member 20 by unscrewing the screws 21a', 21b' and 21c' respectively fixing the frames 21a, 21b and 21c to the movable member 20.

The light transmitted through the imaging lens 15 is incident on that one of the semitransparent prisms 16a–16c which is selected by means of the position control knob 19. The light incident on semitransparent prism 16a, for example, is split into a reflection component and a transmission component. The reflection component forms an image at the predetermined position 29a of the photographing optical path 17a, while the transmission component is directed to photographing optical path 17d after passing through hole 35a of support frame 21a. In the case where semitransparent prism 16b or 16c is selected, the reflection component forms an image at the predetermined position 29b or 29c of the photographing optical path 17b or 17c, and the transmission component is directed to photographing optical path 17d after passing through hole 35b or 35c of support frame 21b or 21c.

The light guided to the observing optical path 23 is passed through the position 29e and thereafter directed to an observing lens barrel 27 through a relay lens system 26 comprised of a plurality of groups of lenses. The relay lens system includes at least two groups of lenses. The former group consists of pupil relay lenses 26c for relaying a pupil image of the objective lens 11 to project the pupil image on the position 95. A pupil modulator 26b, having an amplitude modification function as that of a phase plate for phase contrast or a modification contrast modulator, is provided at the conjugate position 95 with respect to the pupil image. The pupil modulator 26b is detachably attached to the exterior of the main microscope housing 1 by means of a mechanism as will be described later. The latter group of lenses 26a consists of first image relay lenses for projecting the primary image formed on the position 29e of the objective lens 11 to an infinite point. Light output from the image relay lenses 26a is parallel and incident on imaging lenses (second image relay lenses) 27a in the observing lens barrel 27. The imaging lenses 27a image the incident light at the position 29e' in the observing lens barrel 27. The observer can observe an enlarged image of the sample 9 formed at the position 29e' through an eyepiece 27b.

Figure 6:
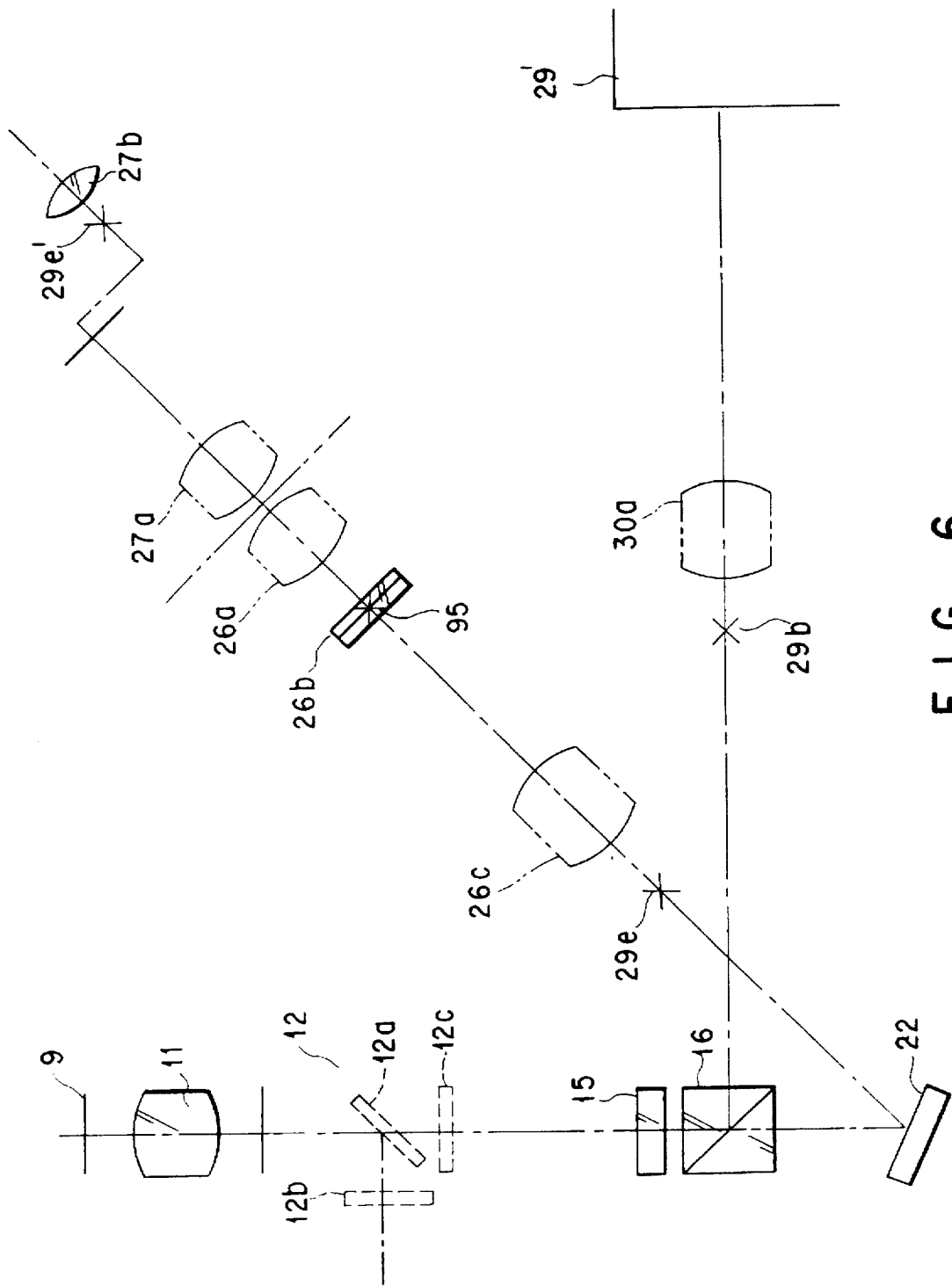
FIG. 6 is a diagram showing only the optical system of the first embodiment.

A function of the optical system of the present invention will be described. FIG. 6 shows an optical system of the inverted microscope, excluding the transmitted illumination optical system.

The image of the sample 9 is enlarged by the objective lens 11, and an enlarged beam is passed through the imaging lens 15 and the first optical element 16, incident on the second optical element 22, and reflected toward the observing optical path 23 (although not shown, part of the enlarged beam is passed through the second optical element 22 and guided to the optical path 17d). The enlarged beam reflected by the second optical element 22 to the observing optical path 23 is imaged at the point 29e as a primary image. The primary image is guided to the pupil relay lenses 26c, the pupil modulator 26b and the first image relay lenses 26a, and focused near the eyepiece 27b by second image relay lenses 27a as a secondary image. The secondary image is observed through the eyepiece 27b as described above.

An attachment surface (indicated by a broken line in FIG. 6), on which the observing lens barrel 27 is attached to the main microscope housing 1, is located between the first and second image relay lens groups 26a and 27a. Therefore, the second relay lenses 27a correspond to imaging lenses 27a in the observing lens barrel.

An imaging system will now be described. The objective lens 11 is an infinity-designed lens. A primary image is formed by the imaging lens 15 and a secondary image is formed near the eyepiece 27b by the pupil relay lenses 26c and the image relay lenses 27a. Since the objective lens 11 is an infinity-designed lens, a parallel optical system is formed between the objective lens 11 and the imaging lens 15. Hence, when an image of the sample 9 is focused by the objective lens, even if the objective lens 11 is moved, the position of the primary image is not changed. Hence, since a focusing mechanism can be achieved only by moving the objective lens 11, a mechanism generally called "revolver up-down system", in which the revolver 10 having a plurality of objective lenses 11 is moved upward and downward, can be employed as a focusing mechanism.

In the above embodiment, the image of the pupil of the objective lens 11 located near the revolver attachment surface of the objective lens 11 is passed through the imaging lens 15 and the first optical element 16, reflected by the second optical element 22 about 450° upward and projected on the pupil modulator 26b. Further, another pupil modulator can be provided near the condenser lens 7, at the position conjugate to the pupil of the objective lens 11. The pupil modulator 26b in the relay lens system 26 is hereinafter referred to as a first pupil modulator, and the pupil modulator provided near the condenser lens as a second pupil modulator 100.

In practice, the optimal position of a pupil modulator in the direction of the optical axis is slightly changed due to errors of optical elements used in the relay system, particularly errors in refractive index. Hence, it is desirable that the pupil modulators have a structure capable of fine adjustment in the direction of the optical axis. In view of this, the pupil modulators of this embodiment have a structure capable of position adjustment and alignment in the direction of the optical axis.

If an optimal pupil modulator 26b, for observing a living cell or a cultured cell cultured on a microwell plate or in a plastic Erlenmeyer flask, is prepared, a contrast most suitable for a vessel can be obtained simply by inserting the pupil modulator 26b in the relay lens system 26, without exchanging objective lenses.

In the optical system having the first and second pupil modulators, phase plates 82a and 82b are provided in the first pupil modulator 26b and a ring slit is provided in the second pupil modulator. With this structure, a phase contrast can easily be observed without using an objective lens only for use in phase contrast observation.

The optimal characteristic of a pupil modulator depends on the magnification, the numerical aperture or the pupil position of the objective lens 11 and the kind of sample 9 to be observed. However, according to this embodiment, since the characteristic of pupil modulator can be changed by means of a pupil modulation slider 81, the type of pupil modulator can be easily changed to a most suitable one in accordance with the type of the objective lens 11 and the kind of sample 9.

Since a phase contrast or modulation contrast microscope (Hoffman system) can be used, this embodiment is advantageous in that a cell in a plastic culturing vessel to be observed is not influenced by degradation of the polarization property due to the vessel.

With a phase contrast or modulation contrast microscope (Hoffman method), it is possible to observe a sample with an objective lens of a low magnification. However, if a low-magnification Nomarski lens is used as an objective lens, retardation may occur in a peripheral portion of the field of view due to a pupil aberration, resulting in nonuniformity in the field of view. According to the present invention, since a Nomarski interference system is not used, nonuniformity in the field of view does not occur. Further, degradation of an image, which may arise in a polarizing observation method or a Nomarski observation method, does not occur.

FIGS. 7 and 8 show mechanical structures of the first pupil modulator 26b. The first pupil modulator 26b comprises a pupil modulation slider 81 near a conjugate point 95 with respect to an image of the pupil of the objective lens in the relay lens system 26. The pupil modulation slider 81 is engaged with an engaging mechanism, (e.g., a click mechanism) not shown. The pupil modulation slider 81 is rectangular and has three openings arranged in the longitudinal direction. The openings on both sides hold two types of phase plates 82a and 82b applicable to two types of objective lenses. The central opening is a through hole 83, which is used in a case where no modulation is required. One of the phase plates 82a and 82b is selected in accordance with the type of the objective lens 11.

V grooves 84 are formed on a side surface of the pupil modulation slider 81 in the longitudinal direction. Each of the V grooves is engaged with the engaging mechanism, when the corresponding phase plate 82a or 82b or the through hole 83 is arranged on the optical axis. The phase plate 82a (82b) is fixed to a cylindrical holding frame 85. The outer surface of the holding frame 85 is circumferentially fitted in the inner surface of an outer frame 86. The holding frame 85 is connected to an operation knob for adjusting a phase film 87 of the phase plate 82a (82b) to a conjugate position with respect to the pupil of the objective lens. The operation knob 88 is screwed through a guiding groove 89 in the peripheral portion of the holding frame 85. The phase film 87 can be adjusted to the conjugate position 95 by moving the operation knob 88 along the guiding groove 89 in the direction of the optical axis. Further, the phase plate 82a (82b) is fixed to the pupil modulation slider 81 by pressing a flange 90 formed on an end peripheral portion of the operation knob 88 against the outer frame 86.

In a case of phase contrast observation, a phase contrast opening is formed near the condenser lens 7 in order to modulate illumination. To align the center of the phase film 87 with the position of this opening, the pupil modulation slider 81 has a plunger 91 and two adjustment knobs 92. The top ends of the plunger 91 and the two adjustment knobs 92 are brought into contact with the outer surface of the outer frame 86, so that the phase film 87 can be aligned to the opening by rotating the adjustment knobs 92.

A sharp image can be obtained but the polarity of a transparent sample cannot be determined by the phase contrast microscope. With the Hoffman system modulation contrast microscope, the polarity of a sample can be determined and a relatively thick transparent sample can be satisfactorily observed. Further, since the focal depth is great in this type of microscope, it is possible to observe a sample three-dimensionally.

A living sample is generally contained in a glass or plastic laboratory dish. With a microscope of the Hoffman system, when a glass laboratory dish is used, polarizing plates are inserted in both pupil modulators to further improve the contrast, and when a plastic laboratory dish is used, deflecting distortion of the plastic dish can be eliminated, without inserting polarizing plates.

According to this embodiment, since the first pupil modulator 26b is arranged in the main microscope housing 1, it is possible to observe phase contrast using a phase plate outside the objective lens or a Hoffman modulation contrast, without using an additional member such as an intermediate lens barrel.

In observing a modulation contrast image, unlike in observing a phase contrast image, it is necessary to rotate a pupil modulator to adjust the polarity of the contrast of the image. According to this embodiment, since the pupil modulation slider is employed, the modulator can be easily removed from the microscope main body and a whole unit of the modulator can be exchanged with another one.

Since the pupil modulator 26b is detachably provided in the main microscope housing 1, the size of the pupil modulating section is reduced and the operability is improved.

Further, since a parallel optical system is formed between the group of the image relay lenses 26a of the observing optical path 23 and the group of the imaging lens 27a of the observing lens barrel 27, the observing lens barrel 27 need not be directly attached to the main microscope housing 1. Alternatively, an observing lens barrel 34 having an attachment surface of inclination different from that of the lens barrel 27 can be attached thereto via an optical path deflecting apparatus 33 as shown in FIG. 2B.

The optical path deflecting apparatus 33 has an optical path deflecting prism 33a to make the observation lens barrel attachment surface horizontal. The observation lens barrel 34 has a prism 34b in an end portion thereof to make the inclination angle of the observation lens barrel 30°, for example. An imaging lens 34a and an eyepiece 27b respectively correspond to the eyepiece 27a and the imaging lens 27b.

An optical path deflecting prism 33b shown in FIG. 2C can be used in place of the optical path deflecting prism 33a shown in FIG. 2B. With the optical path deflecting prism 33b shown in FIG. 2C, the distance between the sample 9 and the eyepoint of the eyepiece 27b can be reduced.

Intermediate lens barrels, such as a discussion lens barrel, a variable power lens barrel and a photo lens barrel, can be easily inserted in the parallel optical system. More specifically, since the observation lens barrel 27 can be easily removed from the main microscope housing 1, various intermediate lens barrels can be inserted between the observation lens barrel 27 and the main microscope housing 1, if necessary.

Figure 9:
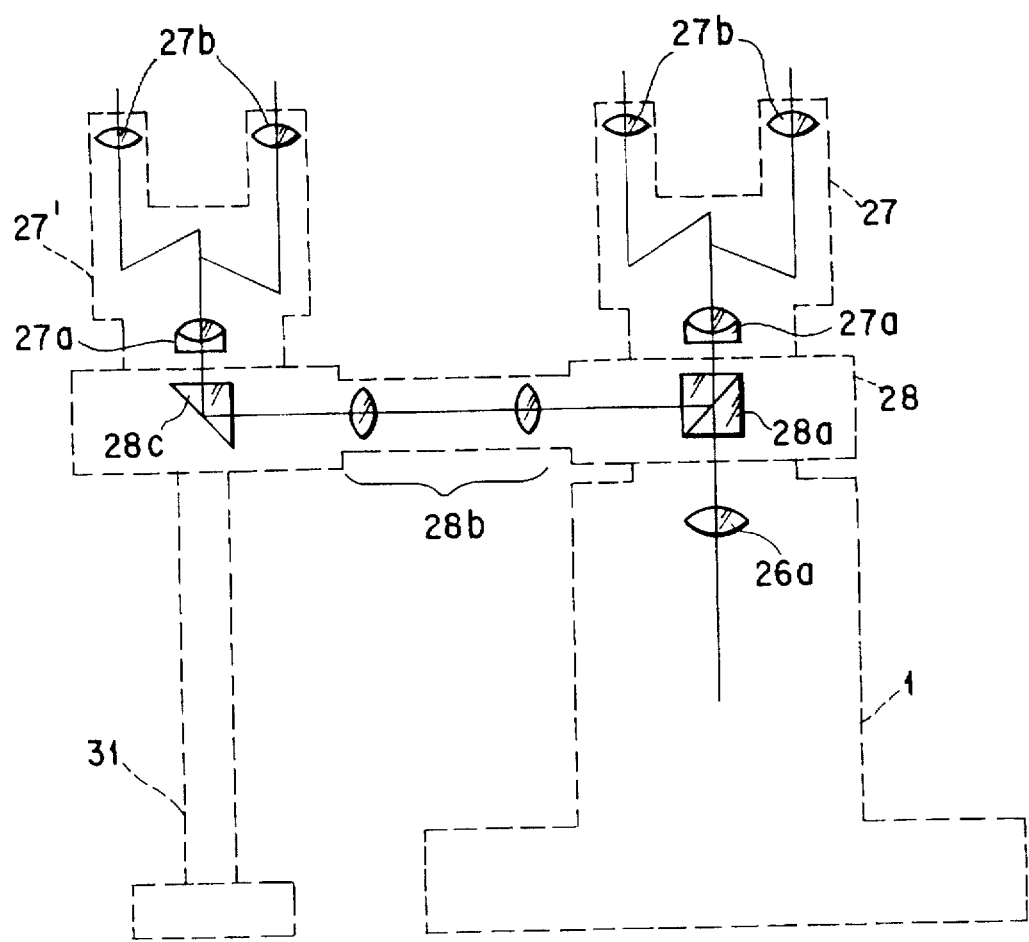
FIG. 9 is a diagram showing the internal structure of a discussion lens barrel incorporated in the first embodiment.

FIG. 9 is a front view of a structure in which a discussion lens barrel as an intermediate lens barrel is inserted in an inverted microscope according to the above embodiment of the present invention.

The discussion lens barrel 28 is mounted on an upper portion of the image relay lenses of the observation optical path, so that a main observer and a sub-observer can simultaneously observe a sample. As shown in FIG. 9, the discussion lens barrel 28 comprises an optical path splitting prism 28a, relay lenses 28b and a reflecting prism 28c. A sub-observation lens barrel 27' has the same structure as that of the observation lens barrel 27. A support leg 31 is connected to the sub-observation lens barrel 27' to stabilize the barrel 27'.

In the structure shown in FIG. 9, the discussion lens barrel 28 is attached to the microscope via the optical path deflecting apparatus 33. However, it can be directly attached to the microscope (the main microscope housing 1). However, since an attachment surface of the discussion lens barrel 28 is inclined, the support leg 31 has a lens barrel supporting portion, which can be exchanged with a more suitable one or modified to support the inclined discussion lens barrel 28.

Since a parallel optical system can be formed in a portion of the observation optical path and the main microscope housing 1 and the observation lens barrel 27 can be separated from each other, it is possible to insert, in that portion, one or two intermediate lens barrels, such as a discussion lens barrel or a variable power lens barrel, in accordance with the object of an experiment. As a result, the applicable field of the microscope can be expanded. Moreover, since an intermediate lens barrel is inserted in the parallel optical system, it is unnecessary to add a special lens to the intermediate lens barrel and a high-quality image can be obtained at any time.

The image relay lenses consist of the first group 26a for projecting an image to an infinite point and the second group 27a for forming a finite image from the image projected to the infinite point, and the lens barrel can be detached from the main microscope body at a position between the first and second groups. Therefore, a lens barrel for use only in observation or photographing can be attached to the microscope, and an image modulated by the pupil modulator can be introduced to a photographing apparatus, so that an image of the sample can be photographed.

Since the infinity designed objective lens 11 is used, a space of at least 50 mm can be formed between the imaging lens 15 and the objective lens 11. Therefore, it is possible to insert, in this space, a dichroic mirror for performing reflected illumination from a fluorescent light emitting tube, a Nomarski prism or a deflecting plate for use in deflection observation. Thus, various observation methods can be performed.

Figure 12:
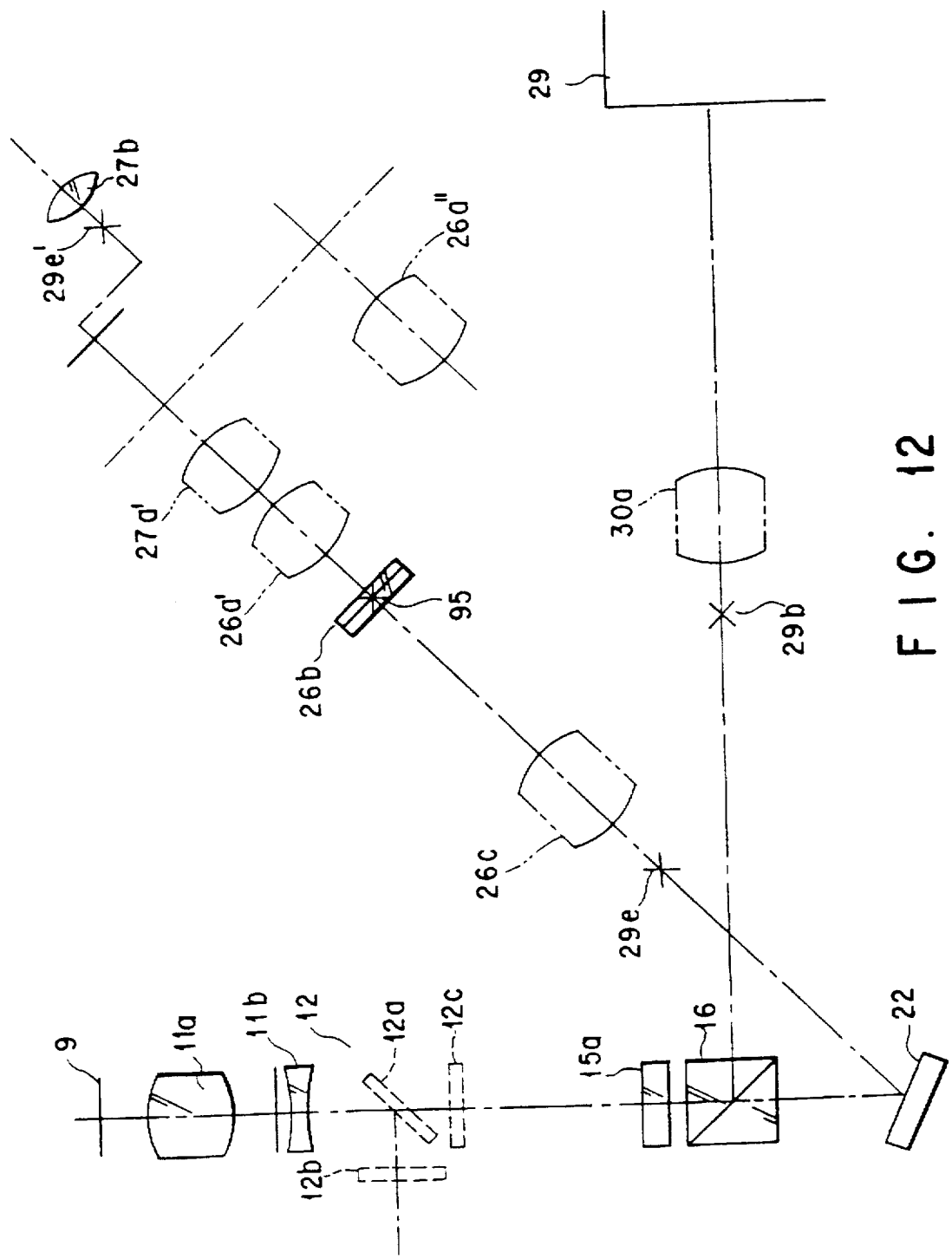
FIG. 12 is a diagram showing a case in which a finite design optical system is applied to the first embodiment.

FIG. 12 shows a modification of the structure shown in FIG. 6. In FIG. 12, a finite objective lens 11a is used in the inverted microscope shown in FIG. 6. In this microscope, light from the sample 9 is passed through the objective lens 11a and made parallel by means of a concave lens 11b. The light is focused by an imaging lens 15a and imaged on the positions 29b, 29e and the like (the same as in FIG. 1). The relay optical system of this modification is similar to that shown in FIG. 6, although slightly modified in accordance with the finite objective lens 11a. In finite design, since the observation lens barrel does not include an imaging lens, the observation lens barrel is attached to the main microscope housing at a surface indicated by the two-dot broken line shown in FIG. 12. The other portions are substantially the same as those in the case of infinity design, except for imaging lenses 26a' and 27a' or an integrally formed lens 26a''.

The fluorescent cube 12 is composed of a dichroic mirror 12a, an exciting filter 12b and an absorbing filter 12c. The fluorescent cube 12, detachably inserted in the optical path (the light 4) of the objective lens 11a, allows fluorescent observation by means of exciting light of various wavelength.

(Second Embodiment)

A second embodiment of the present invention will now be described.

Figure 10:
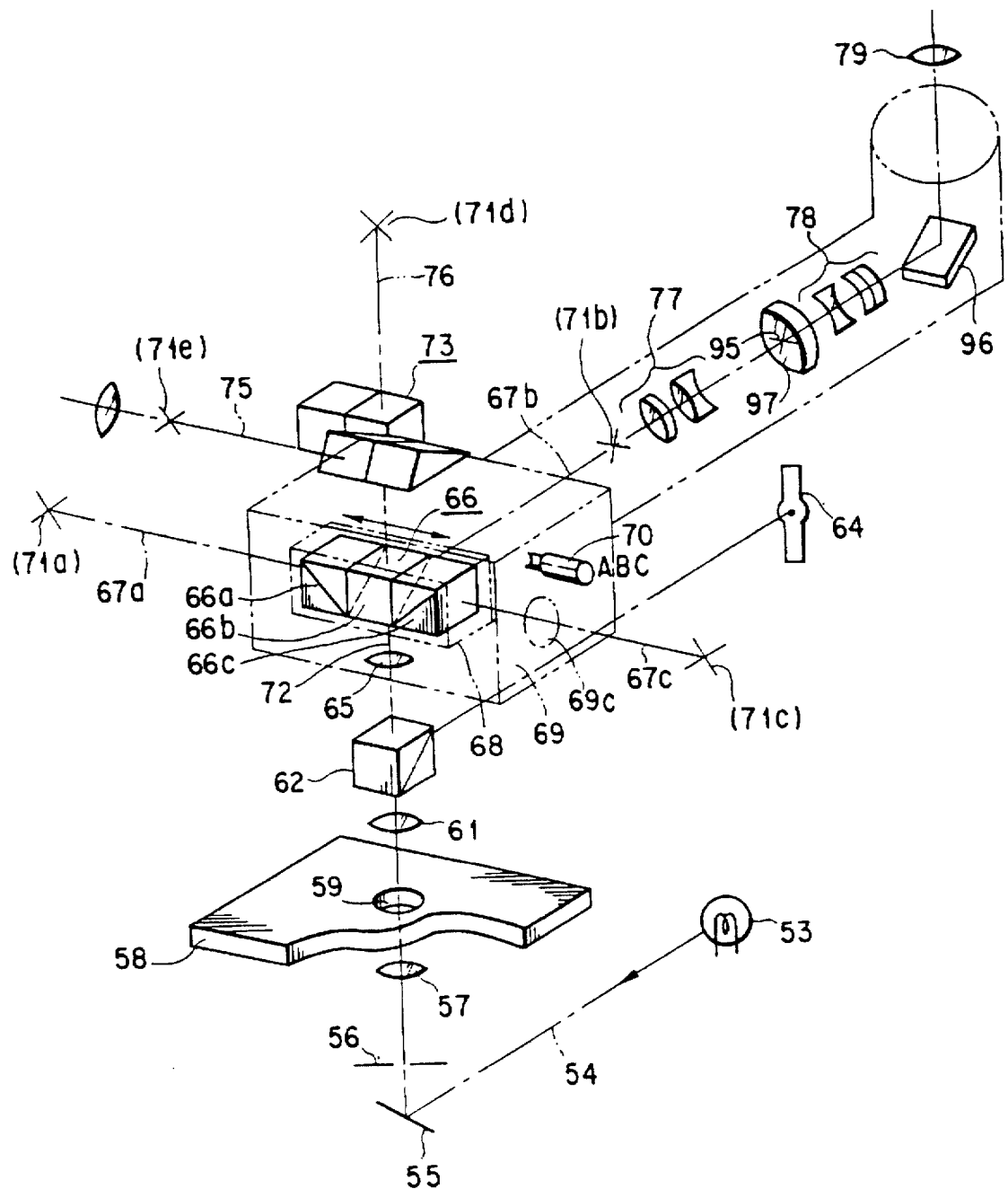
FIG. 10 is a schematic diagram showing an optical structure of an erect microscope according to a second embodiment of the present invention.
Figure 11:
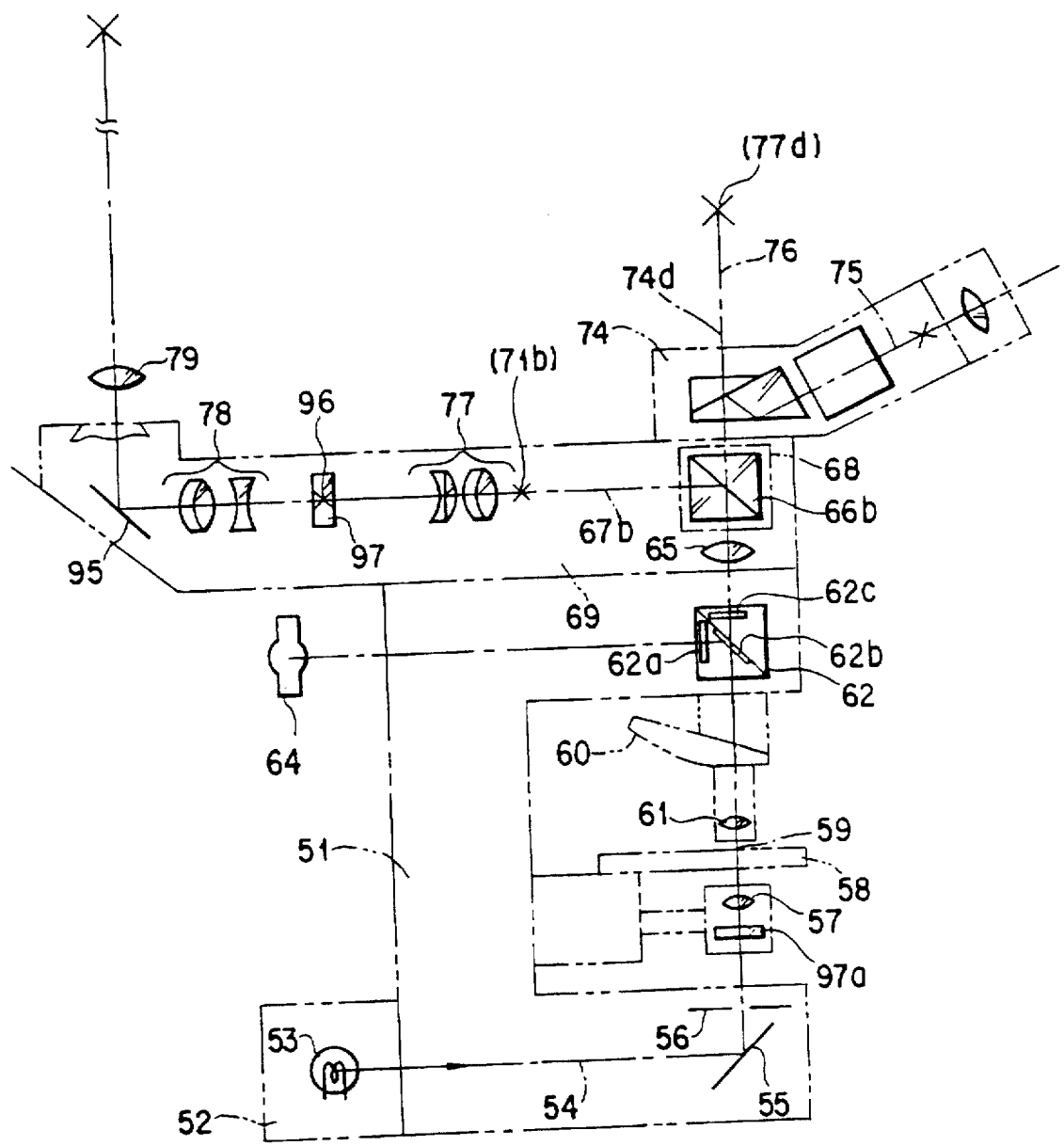
FIG. 11 is a diagram showing a side view of the internal structure of the optical system according to the second embodiment of the present invention.

FIG. 10 is a perspective view of an internal structure of an erect microscope, showing the positional relationship among optical systems of a second embodiment of the present invention, and FIG. 11 is a side view of the microscope showing the internal structure thereof.

A light source 53 is housed in a light housing 52 attached to the bottom end of a main microscope housing 51. Light 54 output from the light source 53 is deflected upward by a reflection mirror 55, passed through a field stop 56 and focused by means of a condenser lens 57 on a sample 59 disposed on a stage 58. The light passed through the sample 59 is incident on an objective lens 61 supported by a revolver 60 arranged above the stage 58. Light of an enlarged image, passed through the objective lens 61, is incident on a fluorescent cube 62 incorporating an exciting filter 62a, dichroic mirror 62b and an absorbing filter 62c. The fluorescent cube 62 receives light from a light source 64 (e.g., a mercury-arc lamp or a xenon lamp) of a reflected illumination system.

An imaging lens 65 for forming an image of light output from the objective lens 61 on a focal position is arranged above the fluorescent cube 62. The light passed through the imaging lens 65 is incident on a first optical element 66.

The first optical element 66 is constituted by three semitransparent prisms 66a, 66b and 66c, arranged in contact with each other, perpendicular to the optical axis, as shown in FIG. 10. Each of the semitransparent prisms 66a to 66c split light incident thereon into light transmitting upward therethrough and light reflected in a direction perpendicular to the optical axis of the incident light.

More specifically, the semitransparent prism 66a transmits the light incident thereon upward and guides it in a direction of a first image-pickup optical path 67a (leftward in FIG. 10). The intermediate semitransparent prism 66b transmits the light incident thereon upward and guides it in a direction of a second image-pickup optical path 67b (see FIG. 11). The semitransparent prism 66c transmits the light incident thereon upward and guides it in a direction of a third photographing optical path 67c (rightward in FIG. 10).

The three semitransparent prisms 66a to 66c are movably supported by a support table 68 indicated by a broken line in the drawings. The semitransparent prisms 66a to 66c supported by the support table 68 are movable as one unit in the horizontal direction in three stages A, B and C, by means of a position control knob 70 projecting through an outer wall of an optical path split unit 69. Thus, any one of the semitransparent prisms 66a to 66c can be selectively moved to a position on the optical axis of the incident light. As a result, the observer can guide the light passed through the imaging lens 65 to any one of the first to third optical paths 67a–67c and observation optical path 75 or image-pickup optical path 76.

When the position control knob 70 is set to A, the semitransparent prism 66a is positioned in the optical path, so that the light is guided through the photographing optical path 67a and imaged at a point (71a).

Similarly, the first optical element 66 is moved in accordance with the Roman character B or C indicated on the position control knob 70. The positional relationship among the semitransparent prisms 66a to 66c and the supporting table 68 is the same as that of the structure shown in FIG. 4 according to the first embodiment. The semitransparent prisms 66a to 66c are mounted on a movable member (the same as the movable member 20 shown in FIG. 4, although not shown in the second embodiment), for selectively setting a desired semitransparent prism in an optical path 72. The movable member can be drawn out of the optical path splitting unit 69. As in the first embodiment, each of the semitransparent prisms 66a to 66c is detachable from the movable member and can be exchanged with another semitransparent prism having another optical characteristic.

The magnifications of the images of the sample 59, which are formed in the optical paths 67a to 67c, are controlled to be completely the same. Since the objective lens 61 itself is an infinity correction objective, it is unnecessary to provide a finite correction objective with an infinity correction lens and the image of the sample can be focused by moving the stage 58. Further, since the imaging lens 65 corresponds to the infinity correction objective and no lens is interposed between the imaging lens 65 and the positions 71a–71e of each optical path, the magnifications in the optical paths are the same. In this embodiment, the focal distance $f_B$ of the imaging lens 65 is 180 mm and the magnification is set to [1×].

Light transmitted upward through one of the semitransparent prisms 66a to 66c of the first optical element 66 is incident on the second optical element 73.

A housing 74 of an optical path splitting unit including the second optical element (optical splitting prism) 73 of this embodiment is a generally known lens barrel having three eyepieces. The optical splitting prism 73 is constituted by three prisms having different splitting ratios to split the light incident thereon to an observation optical path 75 for observing an image of the sample and a photographing optical path 76 for recording the image on a film with a still camera or a TV camera.

The light passed through the second optical element and introduced into the optical path 76 and the light reflected by the second optical element and introduced into the observing optical path 75 are imaged at the points (71d, 71e) at a distance from the second optical element, the same as the distance between an image and the first optical element 66 in each of the optical paths 67a to 67c. It is clear that the magnification of the images of the sample 59 formed in the optical paths 75 and 76 is completely the same as those in the optical paths 67a to 67c, since no lens is interposed between the imaging lens 65 and each of the focal positions in the optical paths.

TV camera mounts (69c, 74d) adapted for a flange back of a desired TV camera are arranged on the exterior of the optical path splitting unit 69 and the lens barrel 74 having three eyepieces, so that a photographing surface of the TV camera can be arranged at the positions (71a, 71c, 71d) in the optical paths 67a, 67c and 76. A mount is also provided on the side of the optical path 67a, although not shown.

A case in which the first optical element (semitransparent prism) 66b is inserted in the optical path 72 will be described in detail with reference to FIG. 11.

Light of an image of the sample 59 enlarged by means of the objective lens 61 is passed through the imaging lens 65 and incident on the semitransparent prism 66b. The incident light is reflected toward the optical path 67b or transmitted into the lens barrel 74 in an amount corresponding to the split ratio of the prism 66b. Since the optical path on the transmitted side has been described before, the light path reflected toward the optical path 67b will now be described.

As shown in FIG. 11, the optical path on the reflected side includes a group of pupil relay lenses 77 for relaying an image of the pupil of the objective lens; groups of secondary image relay lenses 78 and 79 for relaying a primary image (of the sample 59), transmitted through the objective lens 61, formed by the imaging lens 65 at the position 71b; and a reflecting mirror 96 for upwardly deflecting light which has been deflected in the horizontal direction by means of the semitransparent prism 66b.

The housing 69 of the optical path splitting unit includes the imaging lens 65, the semitransparent prisms 66a to 66c, the pupil relay lens 77, one of the groups of secondary image relay lenses 78, and the reflecting mirror 95. The group of secondary image relay lenses 78 projects a primary image to an infinite point and the group 79 forms a finite image from the image projected to the infinite point. A parallel optical

17 path is formed between the groups 78 and 79. The position 95 is a conjugate position with respect to an image of the pupil of the objective lens 61 projected by the pupil relay lenses 77.

The housing 69 of the optical path splitting unit has an opening (not shown) near the conjugate position with respect to the image of the pupil of the objective lens and a pupil modulator 97 of the same structure as that of the pupil modulator shown in FIGS. 7 and 8. The pupil modulator 97 is intermittently fixed to the housing 69 by an engaging mechanism (e.g., a click mechanism) arranged near the conjugate position 95. Another pupil modulator 97a is arranged near the condenser lens 57 shown in FIG. 11.

According to this embodiment as described above, since the microscope has three optical paths reflected by the first optical element 66, even if one of them is used as an optical path only for pupil modulation, the other two paths can be used for, e.g., a high sensitivity TV camera and a high resolution TV camera. In addition, since the magnifications in the optical paths are the same, the size of a sample can be detected easily and the images can be superposed on each other or compared with each other by using a plurality of imaged obtained by the cameras. Further, operability and working efficiency of the microscope and precision of experiments, which are required to perform researches using the fluorescence obscuration or photometry in subdued fluorescent condition, can be enhanced.

Since the pupil modulator 97 is detachably inserted in the optical path of the relay lenses for phase contrast observation or three-dimensional observation, it is possible to simultaneously observe a bright field and a phase difference or fluorescence and a fluorescence phase contrast.

When extremely weak light is to be detected, fluorescent photometry is performed after a phase contrast is observed to detect the position of the sample. In this case, since both the phase contrast observation and the fluorescent photometry can be performed with the same objective lens, misalignment may occur merely due to objective conversion and the measurement accuracy can be improved.

Since the optical path splitting unit of the first optical element and the relay lenses for pupil modulation are detachably connected as an intermediate lens barrel to the microscope, the system operability as an erect microscope can be enhanced.

The relay lenses are divided into two groups and the intermediate lens barrel (the optical path splitting unit 69) is partitioned at an infinity projecting (light beam) portion of the image relay lens system. Therefore, if an observing or photographing lens barrel including the second group of relay lenses is attached to the main microscope unit, misalignment of optical axes due to the division of unit can be suppressed and a manufacturing cost can be reduced.

Since the imaging lens is not arranged in the observing lens barrel immediately above the objective lens, but immediately below the first optical element of the intermediate lens barrel, the intermediate lens barrel can be removed in normal bright field observation or fluorescent observation and an observation lens barrel having an imaging lens can be attached to the main microscope body. Thus, a plurality of optical paths of the same magnification can be formed with a minimum influence on the system operability of the microscope.

Further, a relay lens system capable of pupil modulation may be separated from the housing 69 of the optical path splitting unit on the side reflected by the semitransparent prism 66b as an individual unit, and the interface of the individual unit may have the same shape as that of the TV camera mount (69c) attached to both side surfaces of the housing 69 of the optical path splitting unit. In this case, the relay lens unit can be attached to any one of the optical paths (67a, 67b and 67c) in the three directions.

The focal distance of an imaging lens is not limited to 180 mm, but can be 150 mm to 200 mm, as long as desired optical characteristics are obtained and the overall optical elements can be arranged in a desired number of (e.g., at least 20) fields of view. In addition, although an infinity-designed objective lens is used in the above embodiment, the present invention is also applicable to a finite-designed objective lens. In this case, an imaging point by means of a finite-designed objective lens may be extended or an infinity auxiliary objective lens may be provided at that position of the revolver, which cannot be changed even if the revolver is rotated, so that the focal distance can be infinite.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An inverted microscope comprising:
   a first light source for emitting illuminating light;
   an illuminating optical system for radiating the illuminating light emitted by the first light source to a sample;
   an infinity correction objective lens arranged under the sample, for outputting a light beam forming an enlarged image of the sample;
   an imaging lens for focusing the light beam output from the objective lens so as to output a light beam forming an image of the sample;
   a fluorescent cube having:
      a dichroic mirror arranged at an angle of 450° with respect to an optical axis between the objective lens and the imaging lens, and
      a filter set in which an exciting filter and an absorbing filter are combined so as to allow fluorescent observation;
   a second light source for emitting illuminating light so as to illuminate the sample by reflecting the light on the dichroic mirror of the fluorescent cube;
   a movable first beam splitting unit for splitting the light beam output from the imaging lens into two light beams, said two light beams including a light beam traveling in an optical path extending in a downward transmission direction of the first beam splitting unit, and a light beam traveling in an optical path which is selected from among a plurality of optical paths extending in directions different from said transmission direction by moving the first beam splitting unit by a moving mechanism;
   a second beam splitting unit for guiding the light beam traveling in the optical path extending in the transmission direction of the first beam splitting unit into a plurality of light beams, said plurality of light beams including at least one of:
      (a) a light beam traveling in an optical path extending in a downward transmission direction of the second beam splitting unit, and
      (b) a light beam traveling in an optical path extending in directions different from said transmission direction of the second beam splitting unit;

a main microscope housing for housing the first and second beam splitting units;

a straight image-pickup optical path formed in the optical path into which the light beam transmitted downward through the first and second beam splitting units is directed, a first image-pickup plane which is in said straight image-pickup optical path being arrangeable at a first primary image of the imaging lens, and the first primary image being formed under a base surface of the main microscope housing;

a bias image-pickup optical path formed in such a manner as to include the optical path into which the light beam split by the first beam splitting unit is selectively directed by moving the first beam splitting unit by said moving mechanism, a second image-pickup plane which is in said selected image-pickup optical path being arrangeable at a second primary image of the same imaging lens as for the first primary image, and the second primary image being formed outside of a side surface of the main microscope housing;

an observation optical path formed by the optical path to which the light beam is split by the second beam splitting unit and extending in a direction different from said transmission direction of the second beam unit, and extending outside of the main microscope housing, the observation optical path including a relay system; and an eyepiece, arranged in the observation optical path, for permitting observation of a sample image formed in the observation optical path.

2. An inverted microscope according to claim 1, further comprising a further optical path formed in such a manner as to include the optical path into which the light beam split by the movable first beam splitting unit is selectively directed by moving the movable first beam splitting unit so as to extend the light beam onto a film surface of a photographing unit.

3. An inverted microscope according to claim 1, wherein the straight image-pickup optical path and the bias image-pickup optical path have no lens element between the imaging lens and the first and second primary images formed outside of the main microscope housing.

4. An inverted microscope according to claim 1, wherein said movable first beam splitting unit includes:

a plurality of optical elements, each for splitting incident light into a transmission component and a reflection component;

a movable member for detachably holding the plurality of optical elements such that reflecting directions thereof differ from one another; and a driving mechanism for moving the movable member such that the optical elements are selectively arranged on an optical axis.

5. An inverted microscope according to claim 1, wherein:

a relay system is provided which includes both a pupil relay system and an image relay system, said pupil relay system relaying a pupil image of the objective lens to a predetermined position between the pupil relay system and the image relay system;

the observation optical path includes a first pupil modulator between said pupil relay system and said image relay system, said first pupil modulator being detachably arranged in the observation optical path; and said illuminating optical system includes a condenser lens for illuminating light emitted from the first light source, and a second pupil modulator located near the condenser lens.

6. An inverted microscope according to claim 5, wherein said first pupil modulator includes:

an aligning mechanism for positioning said first pupil modulator with reference to an optical axis; and an adjusting mechanism for positioning said first pupil modulator with reference to a position where the pupil image is formed.

7. An inverted microscope according to claim 1, wherein:

a relay system is provided in the observation optical path, the relay system projecting a primary image formed by the imaging lens to an infinite point; and the inverted microscope further comprises:

an observing lens barrel provided between the main microscope housing and the eyepiece, the observing lens barrel having an observation imaging lens for imaging the parallel light output from the relay system; and a parallel optical system, formed between the relay system and the observing lens barrel, for leading parallel light output from the relay system to the observation imaging lens of the observing lens barrel.

8. An inverted microscope according to claim 7, further comprising an intermediate lens barrel detachably inserted at a portion of the parallel optical system between the main microscope housing and the observing lens barrel.

9. An inverted microscope comprising:

a light source for emitting illuminating light;

an illuminating optical system for radiating the illuminating light emitted by the light source to a sample;

an objective lens, arranged under the sample, for outputting a light beam forming an enlarged image of the sample;

an imaging lens for focusing the light beam output from the objective lens so as to output a light beam forming an image of the sample;

a movable first beam splitting unit for splitting the light beam output from the imaging lens into two light beams, said two light beams including a light beam traveling in an optical path extending in a transmission direction of the first beam splitting unit, and a light beam traveling in an optical path which is selected from among a plurality of optical paths extending in directions different from said transmission direction by moving the first beam splitting unit by a moving mechanism;

a second beam splitting unit, for guiding the light beam traveling in the optical path extending in the transmission direction of the first beam splitting unit into a plurality of light beams, said plurality of light beams including at least a light beam traveling in an optical path extending in directions different from an optical path extending in a transmission direction of the second beam splitting unit;

a plurality of image-pickup optical paths formed in such a manner as to include the optical paths into which the light beam split by the first and second beam splitting units are directed, an image-pickup plane being arrangeable at a primary image of the imaging lens in each of said plurality of image-pickup optical paths;

an observation optical path formed by the optical path to which the light beam is split by the second beam splitting unit and extending in a direction different from said transmission direction of the second beam splitting unit;

a relay system, arranged in the observation optical path, having both a pupil relay system and an image relay system, said pupil relay system relaying a pupil image of the objective lens to predetermined position between the pupil relay system and the image relay system;

a first pupil modulator detachably arranged in the observation optical path between said pupil relay system and said image relay system, a condenser lens included in the illuminating optical system, for illuminating light emitted from the light source;

a second pupil modulator included in the illuminating optical system, and located near the condenser lens; and an eyepiece, arranged in the observation optical path, for permitting observation of a sample image formed in the observation optical path.

10. An inverted microscope according to claim 9, wherein said first pupil modulator includes an adjusting mechanism for positioning said first pupil modulator with reference to a position where the pupil image is formed.

11. An inverted microscope according to claim 9, further comprising:
    a parallel optical system arranged on a predetermined portion of the observation optical path; and
    an intermediate lens barrel detachably inserted in the parallel optical system, a primary image traveling through the intermediate lens barrel in the form of a parallel beam.

12. An inverted microscope according to claim 9, further comprising:
    a fluorescent cube having:
        a dichroic mirror arranged at an angle of 45° with respect to an optical axis between the objective lens and the imaging lens, and
        a filter set in which an exciting filter and an absorbing filter are combined so as to allow fluorescent observation; and
    a second light source for emitting illuminating light so as to illuminate the sample by reflecting the light on the dichroic mirror of the fluorescent cube.

13. An inverted microscope according to claim 9, wherein said first pupil modulator includes an aligning mechanism for positioning said first pupil modulator with reference to an optical axis.

14. A microscope comprising:
    a light source for emitting illuminating light;
    an illuminating optical system for radiating the illuminating light emitted by the light source to a sample;
    an objective lens for outputting a light beam forming an enlarged image of the sample;
    an imaging lens for focusing the light beam output from the objective lens so as to output a light beam forming an image of the sample;
    a movable first beam splitting unit for splitting the light beam output from the imaging lens into two light beams, said two light beams including a light beam traveling in an optical path extending in a transmission direction of the first beam splitting unit, and a light beam traveling in an optical path which is selected from among a plurality of optical paths extending in directions different from said transmission direction by moving the first beam splitting unit by a moving mechanism;
    a second beam splitting unit for guiding the light beam traveling in the optical path extending in the transmission direction of the first beam splitting unit into a plurality of light beams, said plurality of light beams including at least one of:
        (a) a light beam traveling in an optical path extending in a downward transmission direction of the second beam splitting unit, and
        (b) a light beam traveling in an optical path extending in a direction different from said transmission direction of the second beam splitting unit;
    a housing;
    a straight image-pickup optical path formed in the optical path into which the light beam transmitted downward through the first and second beam splitting units is directed, a first image-pickup plane which is in said image-pickup optical path being arrangeable at a first primary image of the imaging lens, and the first primary image being formed under a base surface of the housing;
    a bias image-pickup optical path formed in such a manner as to include the optical path into which the light beam split by the first beam splitting unit is selectively directed by moving the first beam splitting unit by said moving mechanism, a second image-pickup plane which is in said selected image-pickup optical path being arrangeable at a second primary image of the same imaging lens as for the first primary image, and the second primary image being formed outside of a side surface of the housing;
    an observation optical path formed by the optical path to which the light beam is split by the second beam splitting unit and extending in a direction different from said transmission direction of the first and second beam splitting units, and extending outside of the housing;
    an eyepiece, arranged in the observation optical path, for permitting observation of a sample image formed in the observation optical path; and
    a relay system arranged in the selected image-pickup optical path;
    wherein:
        the relay system includes both a pupil relay system and an image relay system, said pupil relay system relaying a pupil image of the objective lens to a predetermined position between the pupil relay system and the image relay system;
        the observation optical path includes a first pupil modulator between said pupil relay system and said image relay system, said first pupil modulator being detachably arranged in the housing;
        said illuminating optical system includes a condenser lens for illuminating light emitted from the light source, and a second pupil modulator located near the condenser lens; and
        an aligning mechanism is provided for positioning each pupil modulator with reference to an optical axis.

15. A microscope according to claim 14, further comprising:
    a fluorescent cube having a dichroic mirror arranged at an angle of 450° with respect to an optical axis between the object lens and the imaging lens, and a filter set in which an exciting filter and an absorbing filter are combined so as to allow fluorescent observation; and
    a light source for emitting illuminating light so as to illuminate the sample by reflecting the light on the dichroic mirror of the fluorescent cube.

16. A microscope according to claim 14, wherein said housing comprises:

a first optical path split housing for housing said first beam splitting unit; and a second optical path split housing for housing said second beam splitting unit.

17. A microscope according to claim 14, wherein said housing includes a main microscope housing for housing said first and second beam splitting units.

18. A microscope comprising:

a light source for emitting illuminating light;

an illuminating optical system for radiating the illuminating light emitted by the light source to a sample;

an objective lens for outputting a light beam forming an enlarged image of the sample;

an imaging lens for focusing the light beam output from the objective lens so as to output a light beam forming an image of the sample;

a movable first beam splitting unit for splitting the light beam output from the imaging lens into two light beams, said two light beams including a light beam traveling in an optical path extending in a transmission direction of the first beam splitting unit, and a light beam traveling in an optical path which is selected from among a plurality of optical paths extending in directions different from said transmission direction by moving the first beam splitting unit by a moving mechanism;

a second beam splitting unit for guiding the light beam traveling in the optical path extending in the transmission direction of the first beam splitting unit into a plurality of light beams, said plurality of light beams including at least one of:

(a) a light beam traveling in an optical path extending in a downward transmission direction of the second beam splitting unit, and (b) a light beam traveling in an optical path extending in a direction different from said transmission direction of the second beam splitting unit;

a housing;

a straight image-pickup optical path formed in the optical path into which the light beam transmitted downward through the first and second beam splitting units is directed, a first image-pickup plane which is in said image-pickup optical path being arrangeable at a first primary image of the imaging lens, and the first primary image being formed under a base surface of the housing;

a bias image-pickup optical path formed in such a manner as to include the optical path into which the light beam split by the first beam splitting unit is selectively directed by moving the first beam splitting unit, by said moving mechanism, a second image-pickup plane which is in said selected image-pickup optical path being arrangeable at a second primary image of the same imaging lens as for the first primary image, and the second primary image being formed outside of a side surface of the housing;

an observation optical path formed by the optical path to which the light beam is split by the second beam splitting unit and extending in a direction different from said transmission direction of the first and second beam splitting units, and extending outside of the housing;

an eyepiece, arranged in the observation optical path, for permitting observation of a sample image formed in the observation optical path; and a relay system arranged in the observation optical path; wherein:

the relay system includes both a pupil relay system and an image relay system, said pupil relay system relaying a pupil image of the objective lens to a predetermined position between the pupil relay system and the image relay system;

the observation optical path includes a first pupil modulator between said pupil relay system and said image relay system, said first pupil modulator detachably arranged in the housing;

said illuminating optical system includes a condenser lens for illuminating light emitted from the light source, and a second pupil modulator located near the condenser lens; and a moving mechanism is provided for positioning the pupil modulator with reference to an optical axis.

* * * * *